US008196758B2

(12) United States Patent
Lee

(10) Patent No.: US 8,196,758 B2
(45) Date of Patent: Jun. 12, 2012

(54) FRAME ASSEMBLY

(76) Inventor: Yung-Yu Lee, Taichung County (TW)

( * ) Notice: Subject to any disclaimer, the term of this patent is extended or adjusted under 35 U.S.C. 154(b) by 29 days.

(21) Appl. No.: 12/985,622

(22) Filed: Jan. 6, 2011

(65) Prior Publication Data
US 2011/0309046 A1 Dec. 22, 2011

(30) Foreign Application Priority Data

Jun. 17, 2010 (TW) ................................ 99119667 A

(51) Int. Cl.
*A47F 7/00* (2006.01)
*F16B 7/04* (2006.01)
*F16B 9/00* (2006.01)
*F16D 1/00* (2006.01)
*A47G 29/00* (2006.01)

(52) U.S. Cl. .......... 211/26; 403/170; 403/182; 403/231; 312/265.4

(58) Field of Classification Search ............... 211/26, 211/189, 182; 312/265.1–265.4, 223.1, 334.4; 403/205, 217, 231, 170, 180–184

See application file for complete search history.

(56) References Cited

U.S. PATENT DOCUMENTS

| | | | | |
|---|---|---|---|---|
| 2,058,263 A * | 10/1936 | Rosendale | ................ | 312/265.4 |
| 3,218,097 A * | 11/1965 | Bowers et al. | ............... | 403/295 |
| 3,590,753 A * | 7/1971 | Blink et al. | .................. | 248/188 |
| 3,655,254 A * | 4/1972 | Mayer et al. | .............. | 312/265.4 |
| 4,034,535 A * | 7/1977 | Dustmann | ...................... | 52/834 |
| 4,126,364 A * | 11/1978 | Reilly | ........................... | 312/140 |
| 4,558,797 A * | 12/1985 | Mitchell | ...................... | 220/668 |
| 4,610,561 A * | 9/1986 | Cecchellero et al. | ......... | 403/171 |
| 4,758,111 A * | 7/1988 | Vitta | ............................. | 403/176 |
| 4,998,636 A * | 3/1991 | Hardigg | ....................... | 220/4.34 |
| 5,228,762 A * | 7/1993 | Mascrier | ................... | 312/265.4 |
| 5,498,073 A * | 3/1996 | Charbonneau et al. | ..... | 312/257.1 |
| 5,516,225 A * | 5/1996 | Kvols | ........................... | 403/170 |
| 5,873,480 A * | 2/1999 | Wells, Jr. | ..................... | 220/4.02 |
| 6,168,249 B1 * | 1/2001 | Chien | ........................ | 312/265.4 |
| 6,270,283 B1 * | 8/2001 | Turati | ........................... | 403/217 |
| 6,591,571 B2 * | 7/2003 | Fritsche et al. | .............. | 52/655.1 |
| 6,634,824 B2 * | 10/2003 | Liu | ................................ | 403/217 |
| 6,796,623 B1 * | 9/2004 | Fontana et al. | ............ | 312/265.4 |
| 6,811,231 B1 * | 11/2004 | Fontana et al. | ............ | 312/265.1 |
| 6,902,068 B1 * | 6/2005 | Fontana et al. | ................. | 211/26 |
| 8,091,970 B2 * | 1/2012 | Francisquini | ............. | 312/265.1 |
| 2002/0110409 A1 * | 8/2002 | Meggiolan | ................... | 403/170 |
| 2009/0001863 A1 * | 1/2009 | Wyatt et al. | ................ | 312/265.3 |
| 2011/0020057 A1 * | 1/2011 | Shen | ............................. | 403/170 |

FOREIGN PATENT DOCUMENTS

EP 948916 A1 * 10/1999

* cited by examiner

*Primary Examiner* — Darnell Jayne
*Assistant Examiner* — Kimberley S Wright
(74) *Attorney, Agent, or Firm* — Nixon & Vanderhye P.C.

(57) ABSTRACT

A frame assembly includes upper and lower frame units, four vertical frame rods, four pairs of top and bottom female connectors, eight male connectors, and first and second bolts. Each frame unit includes four rectangularly-arranged horizontal frame rods. Each female connector interconnects an adjacent pair of the horizontal frame rods, and includes two horizontal tenons engaging respectively the adjacent pair of the horizontal frame rods. The male connectors are connected respectively to opposite ends of the vertical frame rods. Each male connector includes a vertical tenon engaging a respective one of the opposite ends of the vertical frame rods, and an engaging block mating with a respective one of the female connectors. The first and second bolts are for securing releasably and respectively the female connectors to the male connectors.

7 Claims, 5 Drawing Sheets

US 8,196,758 B2

FRAME ASSEMBLY

CROSS-REFERENCE TO RELATED APPLICATION

This application claims priority of Taiwanese application No. 099119667, filed on Jun. 17, 2010.

BACKGROUND OF THE INVENTION

1. Field of the Invention

The invention relates to a storage device, more particularly to a frame assembly.

2. Description of the Related Art

Generally, a power distribution box is used to retain electrical equipments, and comprises a frame assembly and a plurality of cover plates mounted on the frame assembly. U.S. Pat. Nos. 6,062,664 and 5,806,946 disclose a kind of conventional frame assembly comprising a plurality of corner joints. Each corner joint interconnects an adjacent pair of horizontally-extended frame rods and a vertically-extended frame rod. However, due to difficulties in assembling the corner joints and the frame rods, the conventional frame assembly is generally assembled before delivery to a consumer, thus resulting in relatively high storage and transport costs.

U.S. Pat. No. 6,174,034 B1 discloses another conventional frame assembly comprising rectangularly-arranged upper and lower horizontal frame rod units, a plurality of hollow vertical frame rods having opposite end portions formed with screw holes, a plurality of tenons, and a plurality of bolts. The tenons are provided respectively on corner portions of the upper and lower horizontal frame rod units and are formed respectively with a plurality of threaded holes that correspond respectively to the screw holes of the vertical frame rods. The bolts extend respectively through the screw holes of the vertical frame rods and engage respectively and threadedly the threaded holes of the tenons for securing the vertical frame rods to the horizontal frame rod units. However, since the tenons are welded to the horizontal frame rod units, and since each of the screws hole is formed in a relatively thin segment of a respective one of the end portions of the vertical frame rods, engaging strength between the vertical frame rods and the tenons is relatively weak.

SUMMARY OF THE INVENTION

Therefore, the object of the invention is to provide a frame assembly that is easy to assemble and that has a relatively high structural strength.

Accordingly, a frame assembly of the present invention comprises an upper frame unit, a lower frame unit, a vertical frame unit, four top female connectors, four bottom female connectors, eight male connectors, and a plurality of first and second bolts. The upper frame unit includes four rectangularly-arranged horizontal frame rods. The lower frame unit is spaced apart from the upper frame unit in a vertical direction and includes four rectangularly-arranged horizontal frame rods. The vertical frame unit includes four vertical frame rods. Each of the vertical frame rods extends between the upper and lower frame units and has opposite ends in the vertical direction. Each of the top female connectors interconnects an adjacent pair of the horizontal frame rods of the upper frame unit. Each of the bottom female connectors interconnects an adjacent pair of the horizontal frame rods of the lower frame unit. Each of the top and bottom female connectors includes two horizontal tenons that engage respectively the adjacent pair of the horizontal frame rods of the corresponding one of the upper and lower frame units, a connecting wall that interconnects the horizontal tenons and that is formed with a horizontal threaded hole, and an end wall that is formed with a vertical through hole. The end wall of each of the top female connectors is connected to a top end of the connecting wall of a corresponding one of the top female connectors. The end wall of each of the bottom female connectors is connected to a bottom end of the connecting wall of a corresponding one of the bottom female connectors. The end wall of each of the top and bottom female connectors cooperates with the connecting wall of the corresponding one of the top and bottom female connectors to define a receiving space therebetween.

The male connectors are connected respectively to the opposite ends of the vertical frame rods. Each of the male connectors includes a vertical tenon that engages a respective one of the opposite ends of the vertical frame rods, and an engaging block that is connected to the vertical tenon, that is received in the receiving space of a respective one of the female connectors, and that is formed with a vertical threaded hole corresponding in position to the vertical through hole of the end wall of the respective one of the top and bottom female connectors, and a horizontal through hole corresponding in position to the horizontal threaded hole of the connecting wall of the respective one of the top and bottom female connectors. The first and second bolts are for securing releasably the top and bottom female connectors to the respective one of the male connectors. The first bolts extend vertically and respectively through the vertical through holes of the top and bottom female connectors and engage threadedly and respectively the vertical threaded holes of the male connectors. The second bolts extend horizontally and respectively through the horizontal through holes of the male connectors and engage threadedly and respectively the horizontal threaded holes of the top and bottom female connectors.

BRIEF DESCRIPTION OF THE DRAWINGS

Other features and advantages of the invention will become apparent in the following detailed description of the preferred embodiment with reference to the accompanying drawings, of which.

DETAILED DESCRIPTION OF THE PREFERRED EMBODIMENT

Figure 1:
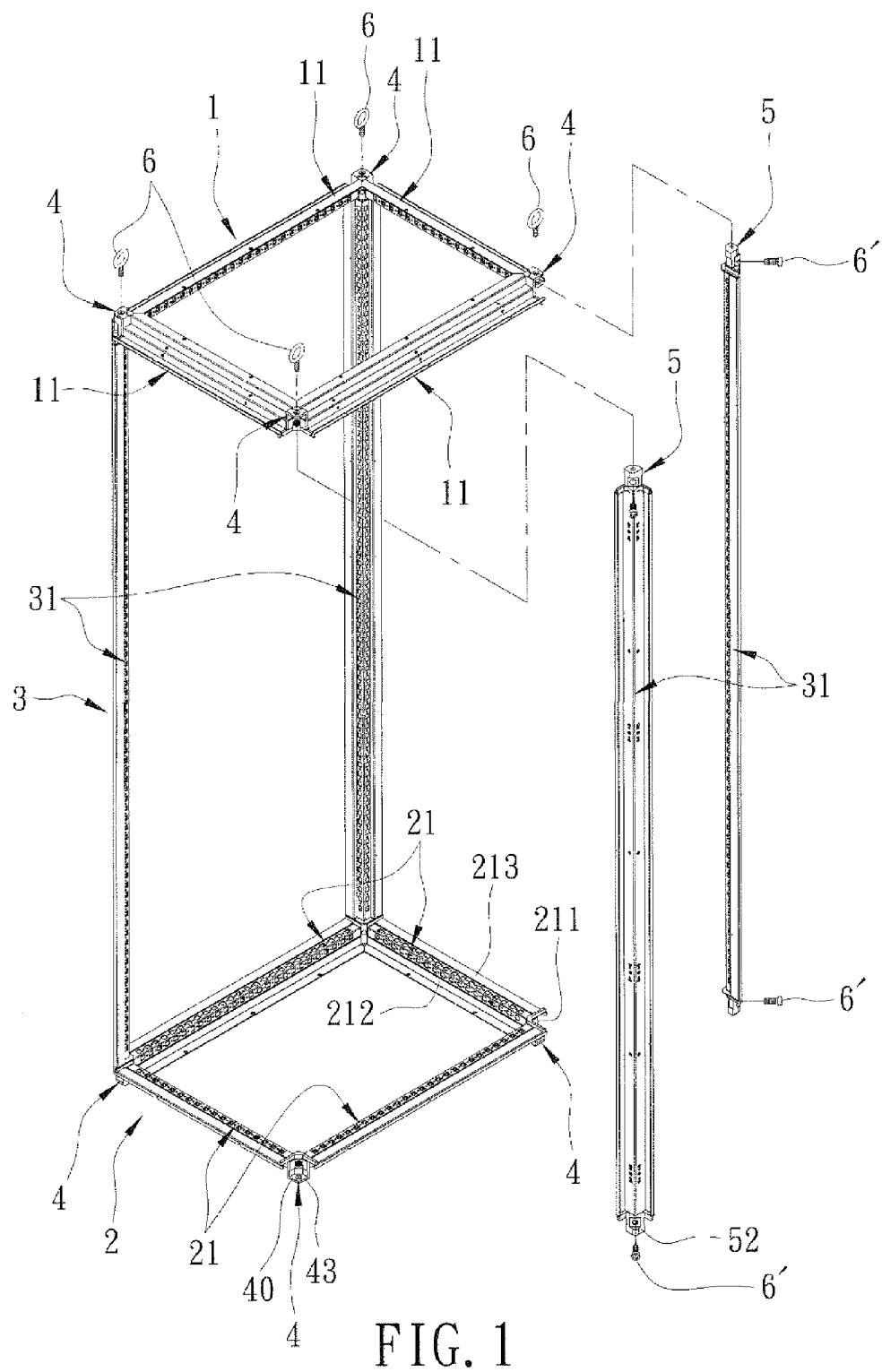
FIG. 1 is a partly exploded perspective view of a preferred embodiment of a frame assembly according to the present invention.
Figure 2:
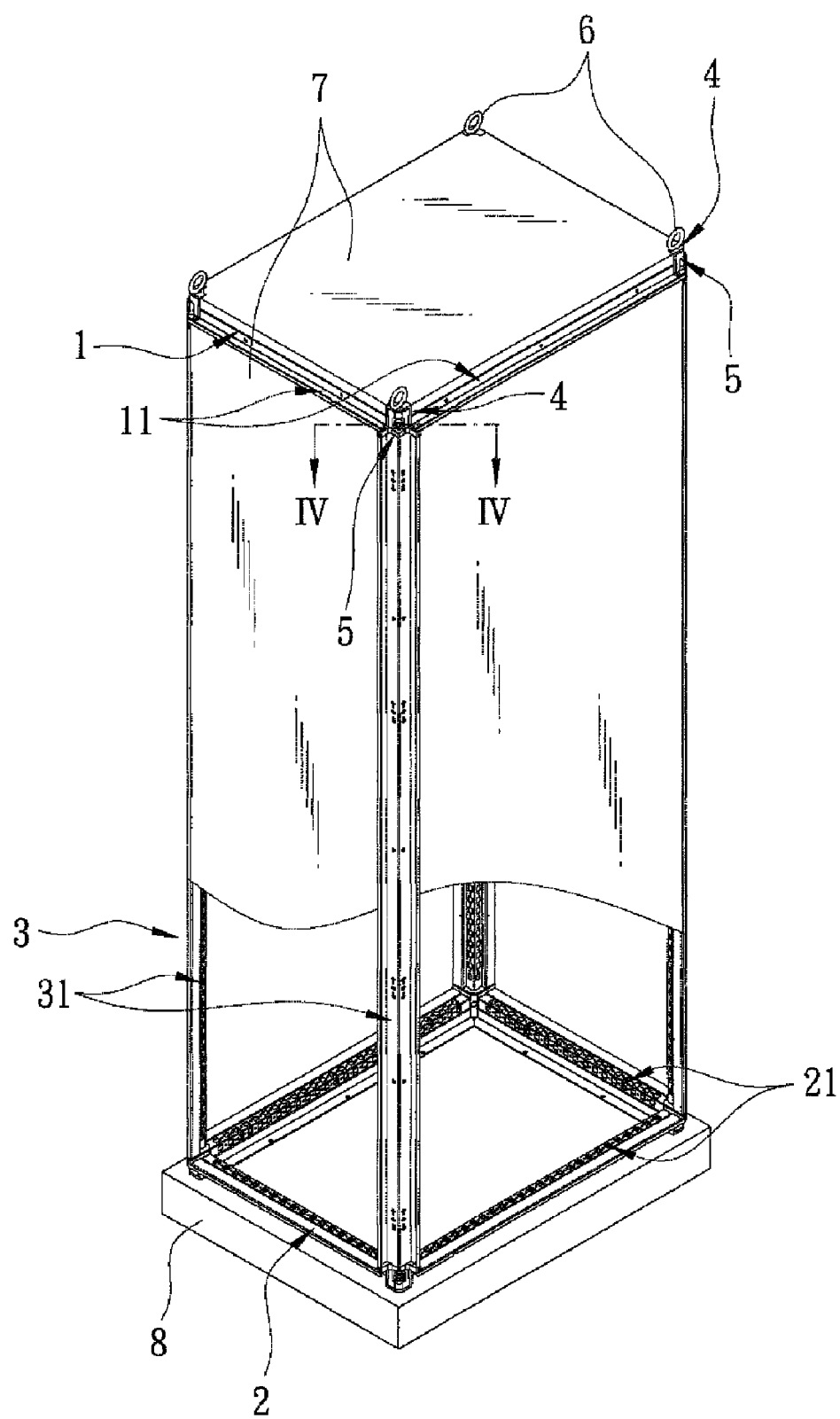
FIG. 2 is a fragmentary perspective view of the preferred embodiment mounted with a plurality of cover plates and a base seat.

Referring to FIGS. 1 and 2, a preferred embodiment of a frame assembly according to the present invention is shown. The frame assembly includes an upper frame unit 1, a lower frame unit 2, a vertical frame unit 3, four pairs of top and bottom female connectors 4, eight male connectors 5, and a plurality of first and second bolts 6, 6'. The frame assembly is adapted to be provided on a base seat 8 and mounted with a plurality of cover plates 7 for storage of electrical equipments.

Figure 3:
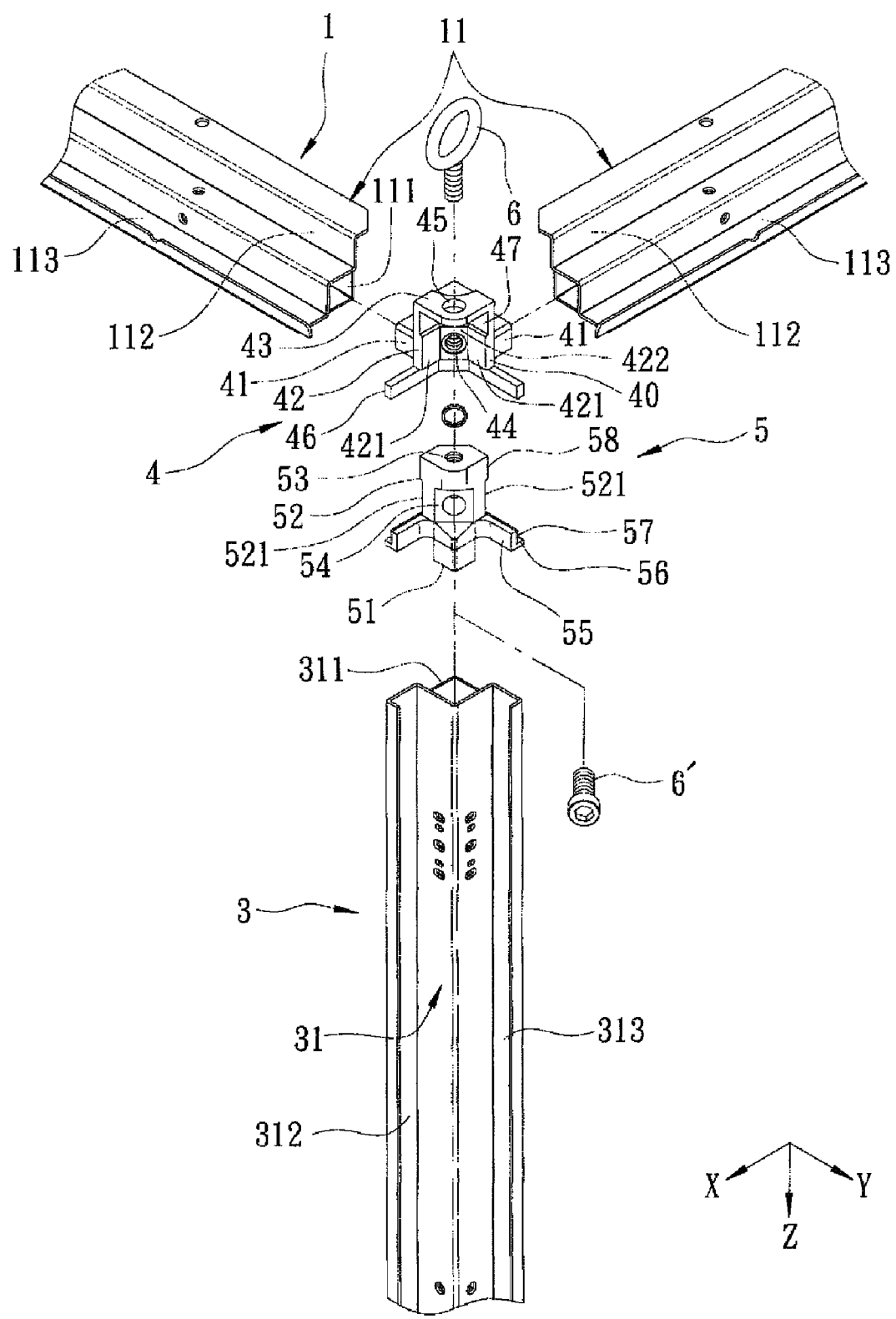
FIG. 3 is a fragmentary exploded perspective view of the preferred embodiment, illustrating a male connector, a top female connector, an upper frame unit and a vertical frame rod.

Further referring to FIG. 3, the upper frame unit 1 includes four rectangularly-arranged horizontal frame rods 11. Each of the horizontal frame rods 11 of the upper frame unit 1 includes a hollow rod body 111, a vertical wing plate 112 extending upwardly from the rod body 111, and a horizontal wing plate 113 connected to the rod body 111 and extending horizontally away from an opposite one of the horizontal frame rods 11 of the upper frame unit 1.

The lower frame unit 2 is spaced apart from and structurally symmetrical to the upper frame unit 1 in a vertical direction (Z) and includes four rectangularly-arranged horizontal frame rods 21. Each of the horizontal frame rods 21 of the lower frame unit 2 includes a hollow rod body 211, a vertical wing plate 212 extending downwardly from the rod body 211, and a horizontal wing plate 213 connected to the rod body 211 and extending horizontally away from an opposite one of the horizontal frame rods 21 of the lower frame unit 2.

The vertical frame unit 3 includes four vertical frame rods 31 extending between the upper and lower frame units 1, 2. Each of the vertical frame rods 31 includes a hollow rod body 311 having opposite open ends in the vertical direction (Z), a first wing plate 312, and a second wing plate 313. For each vertical frame rod 31, the first wing plate 312 is connected to the rod body 311 and extends away from an opposite one of the vertical frame rods 31 in a first horizontal direction (X) that is transverse to the vertical direction (Z). The second wing plate 313 is connected to the rod body 311 and extends away from an opposite one of the vertical frame rods 31 in a second horizontal direction (Y) that is transverse to the vertical direction (Z) and the first horizontal direction (X).

Each of the top and bottom female connectors 4 includes two horizontal tenons 41 that engage respectively an adjacent pair of the horizontal frame rods 11, 21 of a corresponding one of the upper and lower frame units 1, 2, a connecting wall 42 that interconnects the horizontal tenons 41 and that is formed with a horizontal threaded hole 44, and an end wall 43 that is connected to the connecting wall 42 and that is formed with a vertical through hole 45. The rod body 111 of each horizontal frame rod 11 of the upper frame unit 1 has opposite open ends, each engaging one of the horizontal tenons 41 of a respective one of the top female connectors 4. The rod body 211 of each horizontal frame rod 21 of the lower frame unit 2 has opposite open ends, each engaging one of the horizontal tenons 41 of a respective one of the bottom female connectors 4. The end wall 43 of each of the top female connectors 4 is connected to a top end of the connecting wall 42 of a corresponding one of the top female connectors 4. The end wall 43 of each of the bottom female connectors 4 is connected to a bottom end of the connecting wall 42 of a corresponding one of the bottom female connectors 4. The end wall 43 of each of the top and bottom female connectors 4 cooperates with the connecting wall 42 of the corresponding one of the top and bottom female connectors 4 to define a receiving space 40 therebetween.

The connecting wall 42 of each of the top and bottom female connectors 4 has an inverted L-shaped configuration, and has two side portions 421 transverse to each other and connected respectively to the horizontal tenons 41 of a corresponding one of the top and bottom female connectors 4, and a joint portion 422 disposed between the side portions 421. The horizontal threaded hole 44 of each of the top and bottom female connectors 4 is formed in the joint portion 422 of the corresponding one of the top and bottom female connectors 4.

The male connectors 5 are connected respectively to the opposite ends of the vertical frame rods 31. Each of the male connectors 5 includes a vertical tenon 51 that engages a respective one of the opposite ends of the vertical frame rods 31, and an engaging block 52 that is connected to the vertical tenon 51, and that is received in the receiving space 40 of a respective one of the top and bottom female connectors 4. The opposite ends of each of vertical frame rods 31 engage respectively the vertical tenons 51 of an adjacent pair of the male connector 5 that correspond in position to each other in the vertical direction (Z). The engaging block 32 of each male connectors 5 is formed with a vertical threaded hole 53 corresponding in position to the vertical through hole 45 of the end wall 43 of the respective one of the top and bottom female connectors 4, and a horizontal through hole 54 corresponding in position to the horizontal threaded hole 44 of the connecting wall 42 of the respective one of the top and bottom female connectors 4. The engaging block 52 of each of the male connectors 5 is received in the respective receiving space 40 and is positioned by the end wall 43 of the respective female connector 4 so as to prevent movement of the engaging block 52 in the vertical direction (Z). Each engaging block 52 has two side portions 521 transverse to each other and abutting respectively against the side portions 421 of the connecting wall 42 of the respective one of the top and bottom female connectors 4, and a joint portion 522 (see FIG. 4) disposed between the side portions 521. The horizontal through hole 54 of each of the male connectors 5 is formed in the joint portion 522 of the engaging block 52 of the corresponding one of the male connectors 5.

Further referring to PIG. 5, the first bolts 6 extend vertically and respectively through the vertical through holes 45 of the top and bottom female connectors 4 in the vertical direction (Z) and engage threadedly, releasably, and respectively the vertical threaded holes 53 of the male connectors S. The second bolts 6' extend horizontally and respectively through the horizontal through holes 54 of the male connectors 5 and engage threadedly, releasably, and respectively the horizontal threaded holes 44 of the top and bottom female connectors 4. Therefore, the top and bottom female connectors 4 are secured releasably to the respective one of the male connectors 5 by the first and second bolts 6, 6'. In this embodiment, each of the first bolts 6 provided on the top female connectors 4 is configured to have a ring portion on an upper end thereof so that the frame assembly can be hung when desired. Moreover, since each combination of a male connector 5 and a corresponding top or bottom female connector 4 is designed to engage the corresponding horizontal frame rods 11, 21 and the corresponding vertical frame rod 31, and since each combination of the male connector 5 and the corresponding top or bottom female connector 4 can be simply secured releasably to each other through the first and second bolts 6, 6', the frame assembly of the present invention can be assembled at a user's side, thereby resulting in a relatively low cost of storage and transport.

Figure 4:
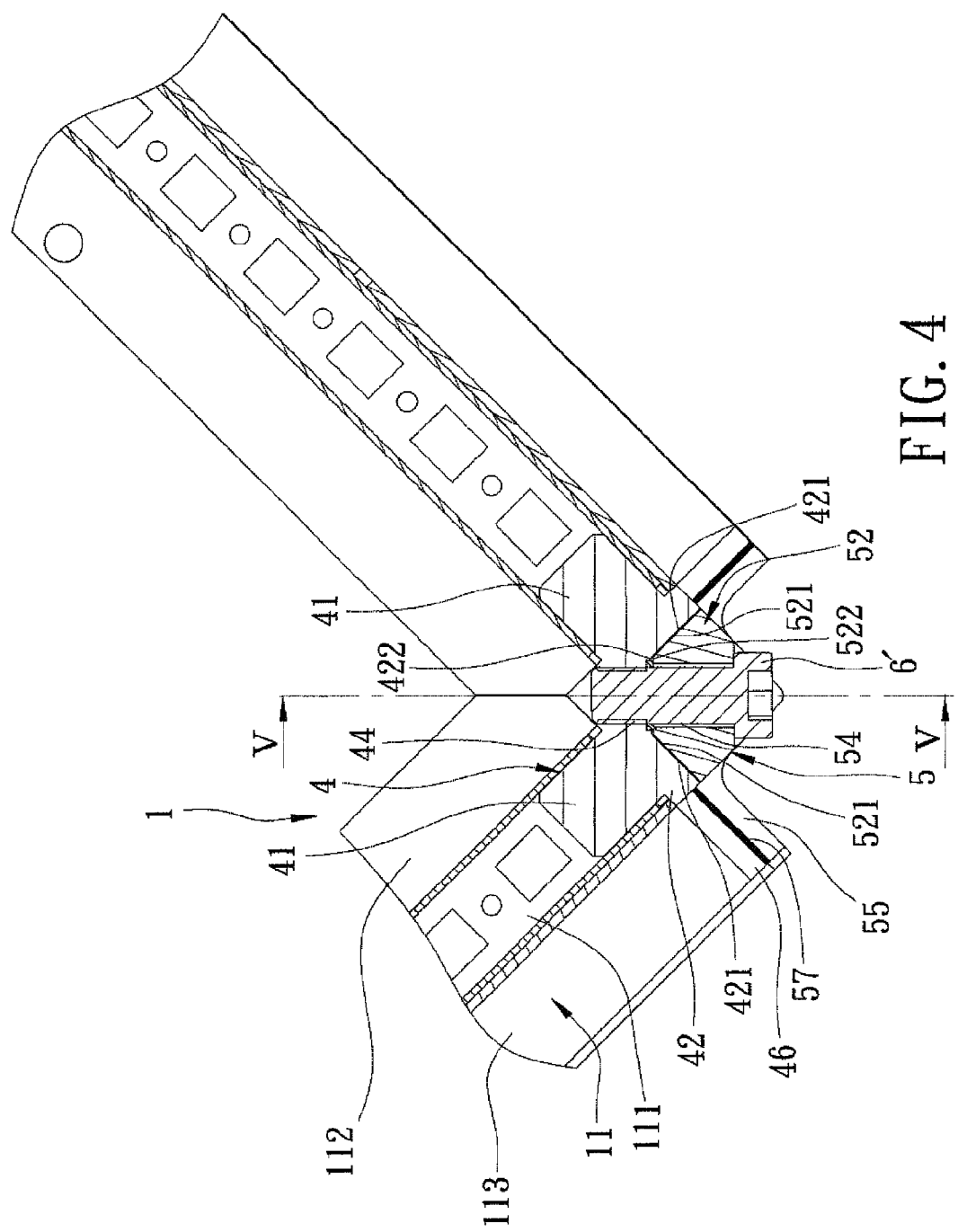
FIG. 4 is a fragmentary sectional view of the preferred embodiment taken along line IV-IV in FIG. 2.
Figure 5:
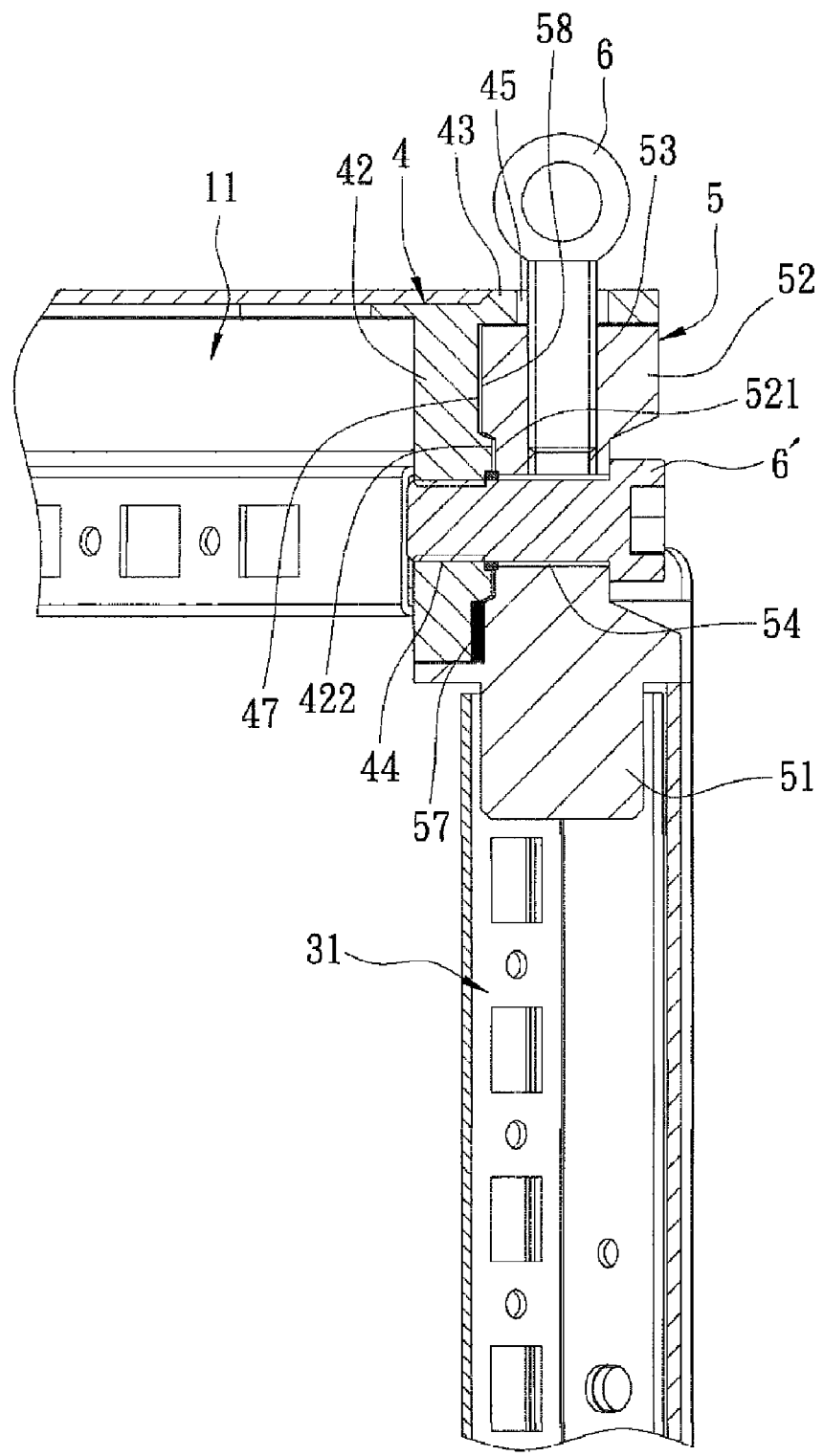
FIG. 5 is a fragmentary sectional view taken along line V-V in FIG. 4.

Referring back to FIG. 3, and further referring to FIG. 4, each of the male connectors 5 further includes an L-shaped waterproof leg 55 that is coupled to the first and second wing plates 312, 313 of a respective one of the vertical frame rods 31 at a corresponding one of the opposite ends thereof, an L-shaped waterproof strip 57 that is attached to the L-shaped waterproof leg 55, and an L-shaped waterproof flange 56 that extends horizontally from the L-shaped waterproof leg 55. In this embodiment, the waterproof strip 57 is made of a foam material. Each of the top and bottom female connectors 4 further includes an L-shaped waterproof leg 46 that has two leg segments transverse to each other and corresponding respectively in position to the horizontal wing plates 113, 213 of the adjacent pair of horizontal frame rods 11, 21, and that is coupled to the L-shaped waterproof leg 55 of the respective one of the male connectors 5, such that each waterproof strip 57 is clamped between the L-shaped waterproof leg 55 of the corresponding one of the male connectors 5 and the L-shaped waterproof leg 46 of the respective one of the top and bottom female connectors 4. By virtue of the L-shaped waterproof legs 55, the L-shaped waterproof flanges 56 and the waterproof strips 57, the electrical equipments disposed in the frame assembly can be well shielded from water.

Preferably, the engaging block 52 of each of the male connectors 5 is further formed with an auxiliary engaging protrusion 58. The connecting wall 42 of each of the top and bottom female connectors 4 is further formed with an auxiliary engaging recess 47 engaging the auxiliary engaging protrusion 58 of the respective one of the male connectors 5.

To sum up, the advantages of the present invention areas follows. Since the top and bottom female connectors 4 and the male connectors 5 interconnect the upper and lower frame units 1, 2 and the vertical frame unit 3 through horizontal tenons 41 and vertical tenons 51, and since the engaging block 52 of each male connector 5 is positioned in the first and second horizontal directions (X,Y) by the side portions 421 of the connecting wall 42 of the respective one of the top and bottom female connectors 4, and is positioned in the vertical direction (Z) by the end wall 43 of the respective female connector 4, engaging strength between the upper and lower horizontal frame units 1, 2 and the vertical frame unit 3 is thus enhanced.

Moreover, through the engagement between each auxiliary engaging protrusion 58 of the male connectors 5 and the respective auxiliary engaging recess 47 of the top and bottom female connectors 4, each combination of the male connector 5 and the corresponding top or bottom female connector 4 can bear a relatively large shearing force applied on the end wall 43 of the top or bottom female connector 4 and the corresponding second bolt 6', thereby further enhancing the engaging strength between the male connector 5 and the corresponding top or bottom female connector 4.

While the invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A frame assembly comprising:
    an upper frame unit including four rectangularly-arranged horizontal frame rods;
    a lower frame unit spaced apart from said upper frame unit in a vertical direction and including four rectangularly-arranged horizontal frame rods;
    a vertical frame unit including four vertical frame rods, each o f said vertical frame rods extending between said upper and lower frame units and having opposite ends in the vertical direction;
    four top female connectors, each interconnecting an adjacent pair of said horizontal frame rods of said upper frame unit;
    four bottom female connectors, each interconnecting an adjacent pair of said horizontal frame rods of said lower frame unit;
    wherein each of said top and bottom female connectors includes
        two horizontal tenons that engage respectively the adjacent pair of said horizontal frame rods of the corresponding one of said upper and lower frame units,
        a connecting wall that interconnects said horizontal tenons and that is formed with a horizontal threaded hole, and
        an end wall that is formed with a vertical through hole, said end wall of each of said top female connectors being connected to a top end of said connecting wall of a corresponding one of said top female connectors, said end wall of each of said bottom female connectors being connected to a bottom end of said connecting wall of a corresponding one of said bottom female connectors, said end wall of each of said top and bottom female connectors cooperating with said connecting wall of the corresponding one of said top and bottom female connectors to define a receiving space therebetween;
    eight male connectors connected respectively to said opposite ends of said vertical frame rods, each of said male connectors including
        a vertical tenon that engages a respective one of said opposite ends of said vertical frame rods, and
        an engaging block that is connected to said vertical tenon, that is received in said receiving space of a respective one of said top and bottom female connectors, and that is formed with a vertical threaded hole corresponding in position to said vertical through hole of said end wall of the respective one of said top and bottom female connectors, and a horizontal through hole corresponding in position to said horizontal threaded hole of said connecting wall of the respective one of said top and bottom female connectors; and
    a plurality of first and second bolts for securing releasably said top and bottom female connectors to the respective one of said male connectors, said first bolts extending vertically and respectively through said vertical through holes of said top and bottom female connectors and engaging threadedly and respectively said vertical threaded holes of said male connectors, said second bolts extending horizontally and respectively through said horizontal through holes of said male connectors and engaging threadedly and respectively said horizontal threaded holes of said top and bottom female connectors.

2. The frame assembly as claimed in claim 1, wherein said connecting wall of each of said top and bottom female connectors has an inverted L-shaped configuration, and has two side portions transverse to each other and connected respectively to said horizontal tenons of a corresponding one of said top and bottom female connectors, said engaging block of each of said male connectors having two side portions transverse to each other and abutting respectively against said side portions of said connecting wall of the respective one of said top and bottom female connectors.

3. The frame assembly as claimed in claim 1, wherein:
    each of said vertical frame rods includes a hollow rod body having opposite open ends that engage respectively said vertical tenons of an adjacent pair of said male connectors that corresponds in position to each other in the vertical direction, a first wing plate connected to said rod body and extending away from an opposite one of said vertical frame rods in a first horizontal direction that is transverse to the vertical direction, and a second wing plate connected to said rod body and extending away from an opposite one of said vertical frame rods in a second horizontal direction that is transverse to the vertical direction and the first horizontal direction;

each of said horizontal frame rods of said upper frame unit includes a hollow rod body having opposite open ends each engaging detachably one of said horizontal tenons of a respective one of said top female connectors, a vertical wing plate extending upwardly from said rod body, and a horizontal wing plate connected to said rod body and extending horizontally away from an opposite one of said horizontal frame rods of said upper frame unit;

each of said horizontal frame rods of said lower frame unit includes a hollow rod body having opposite open ends each engaging one of said horizontal tenons of a respective one of said bottom female connectors, a vertical wing plate extending downwardly from said rod body, and a horizontal wing plate connected to said rod body and extending horizontally away from an opposite one of said horizontal frame rods of said lower frame unit;

each of said male connectors further includes an L-shaped waterproof leg that correspond in position to said first and second wing plates of a respective one of said vertical frame rods at a corresponding one of said opposite ends thereof; and each of said top and bottom female connectors further includes an L-shaped waterproof leg that corresponds in position to said L-shaped waterproof leg of the respective one of said male connectors.

4. The frame assembly as claimed in claim 3, wherein each of said male connectors further includes an L-shaped waterproof strip attached to said L-shaped waterproof leg.

5. The frame assembly as claimed in claim 3, wherein each of said male connectors further includes an L-shaped waterproof flange extending horizontally from said L-shaped waterproof leg.

6. The frame assembly as claimed in claim 4, wherein each of said male connectors further includes an L-shaped waterproof flange extending horizontally from said L-shaped waterproof leg.

7. The frame assembly as claimed in claim 1, wherein each of said male connectors further includes an auxiliary engaging protrusion formed on said engaging block thereof, each of said top and bottom female connectors further including an auxiliary engaging recess formed in said connecting wall thereof and engaging said auxiliary engaging protrusion of the respective one of said male connectors.

* * * * *